(12) United States Patent
Shichino

(10) Patent No.: US 9,343,908 B2
(45) Date of Patent: May 17, 2016

(54) POWER TRANSMITTING APPARATUS, POWER TRANSFER SYSTEM, CONTROL METHOD FOR POWER TRANSMITTING APPARATUS, AND STORAGE MEDIUM

(75) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1121 days.

(21) Appl. No.: 13/316,999

(22) Filed: Dec. 12, 2011

(65) Prior Publication Data
US 2012/0153743 A1 Jun. 21, 2012

(30) Foreign Application Priority Data
Dec. 16, 2010 (JP) .................. 2010-281010

(51) Int. Cl.
*H01F 38/14* (2006.01)
*H02J 5/00* (2016.01)

(52) U.S. Cl.
CPC ...................... *H02J 5/005* (2013.01)

(58) Field of Classification Search
CPC ........... H02J 17/00; H02J 7/005; H02J 7/025; H01F 38/14
See application file for complete search history.

(56) References Cited

U.S. PATENT DOCUMENTS

| | | | | |
|---|---|---|---|---|
| 8,452,235 | B2 * | 5/2013 | Kirby et al. | 455/41.1 |
| 2004/0130916 | A1 * | 7/2004 | Baarman | 363/21.02 |
| 2005/0251018 | A1 * | 11/2005 | Gleman | 600/407 |
| 2006/0083406 | A1 * | 4/2006 | Ishimura et al. | 382/106 |
| 2008/0297107 | A1 | 12/2008 | Kato et al. | |

FOREIGN PATENT DOCUMENTS

| | | | |
|---|---|---|---|
| JP | 2008283789 | A | 11/2008 |
| JP | 2008-295274 | A | 12/2008 |
| JP | 2010-051137 | A | 3/2010 |
| JP | 2010110533 | A | 5/2010 |
| JP | 2010239769 | A | 10/2010 |
| JP | 2011-167031 | A | 8/2011 |

OTHER PUBLICATIONS

Office Action issued in corresponding JP Application No. 2010-281010 dated Jul. 18, 2014.
Office Action issued in counterpart Japanese application No. 2010-281010 on Oct. 10, 2014.

* cited by examiner

*Primary Examiner* — Terrence Willoughby
(74) *Attorney, Agent, or Firm* — Carter, DeLuca, Farrell & Schmidt, LLP

(57) ABSTRACT

A power transmitting apparatus which has a power transmitting antenna, and transfers power from the power transmitting antenna to a power receiving antenna. The power transmitting apparatus includes a storage unit configured to be associated with a position of the power receiving antenna, and to store a parameter for controlling a resonance frequency of the power transmitting antenna; a determination unit configured to determine the position of the power receiving antenna; and a control unit configured to control the resonance frequency of the power transmitting antenna based on the position of the power receiving antenna.

16 Claims, 12 Drawing Sheets

FIG. 2A
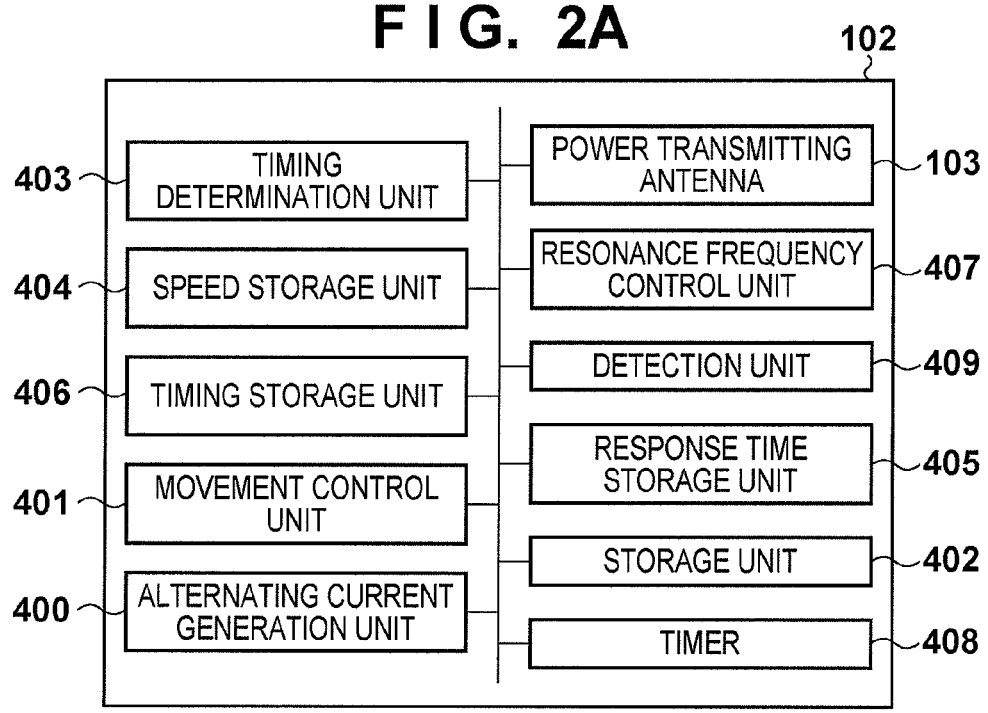
FIG. 2B
| 500 | ANGLE (DEGREES) | 0 | 1 | 2 | ... | 360 |
|---|---|---|---|---|---|---|
| 501 | CAPACITANCE (pF) | 30 | 31 | 32 | | 30 |
FIG. 2C
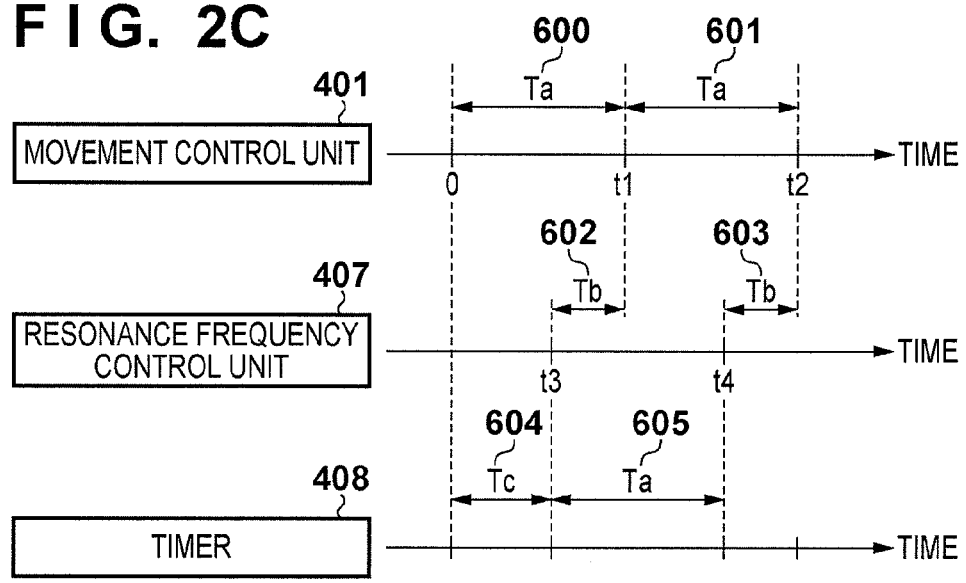

F I G. 3C
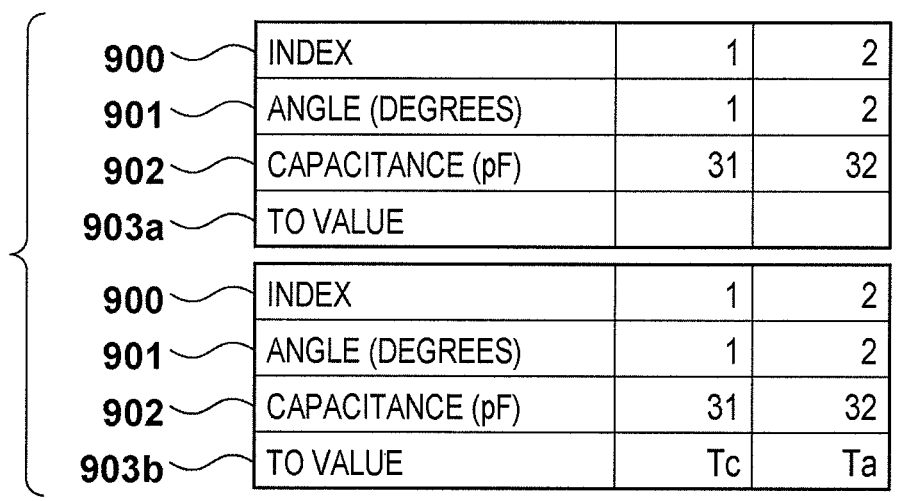

FIG. 5A
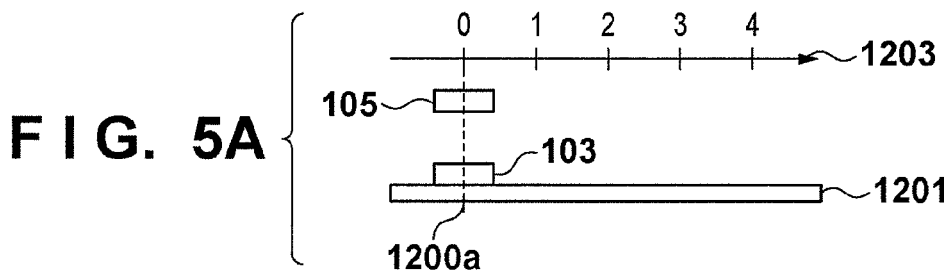
FIG. 5B
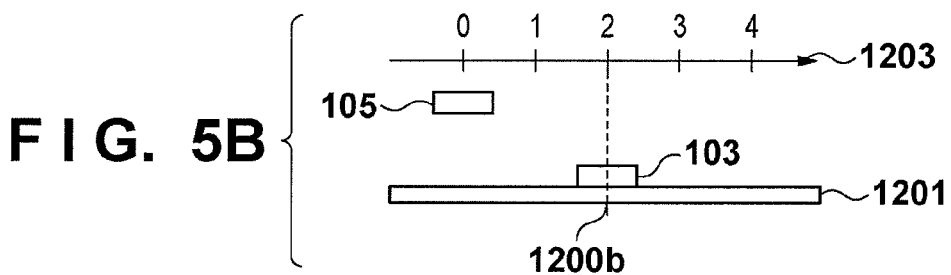
FIG. 5C
| 1300a | POSITION | 0 | 1 | 2 | 3 | 4 |
|---|---|---|---|---|---|---|
| 1301a | CAPACITANCE (pF) | 30 | 31 | 32 | 33 | 34 |
FIG. 5D
| 1300b | POSITION | 0.4 | 1.3 | 2 |
|---|---|---|---|---|
| 1301b | CAPACITANCE (pF) | 32 | 31 | 30 |
FIG. 5E
| 1400 | ANGLE (DEGREES) | 0~2 | 2~3 |
|---|---|---|---|
| 1401 | AREA | 1 | 2 |
| 1402 | CAPACITANCE (pF) | 30 | 32 |
FIG. 5F
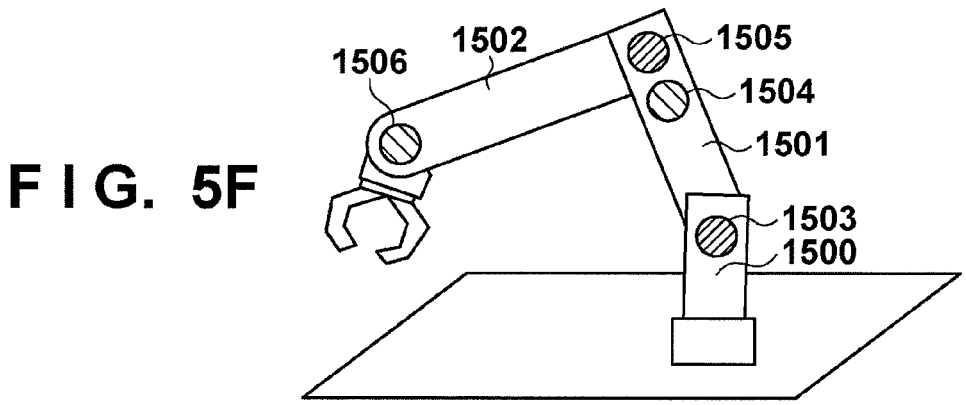

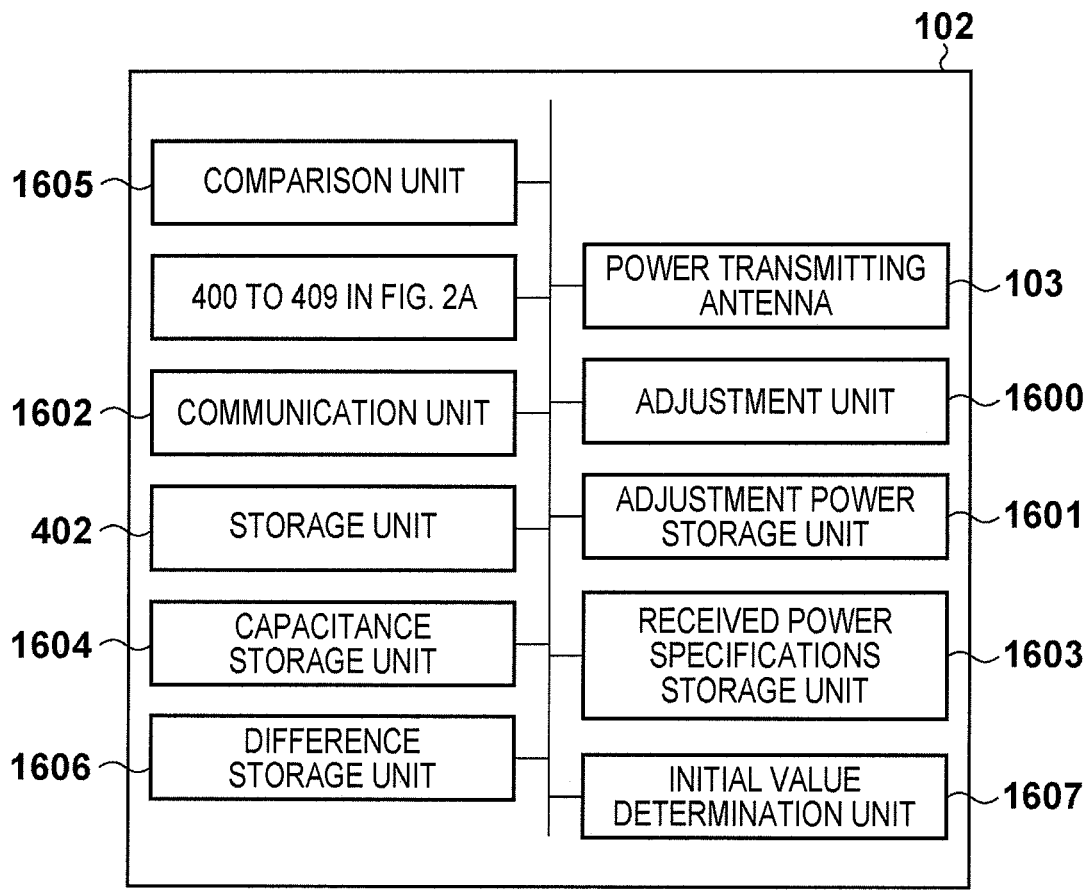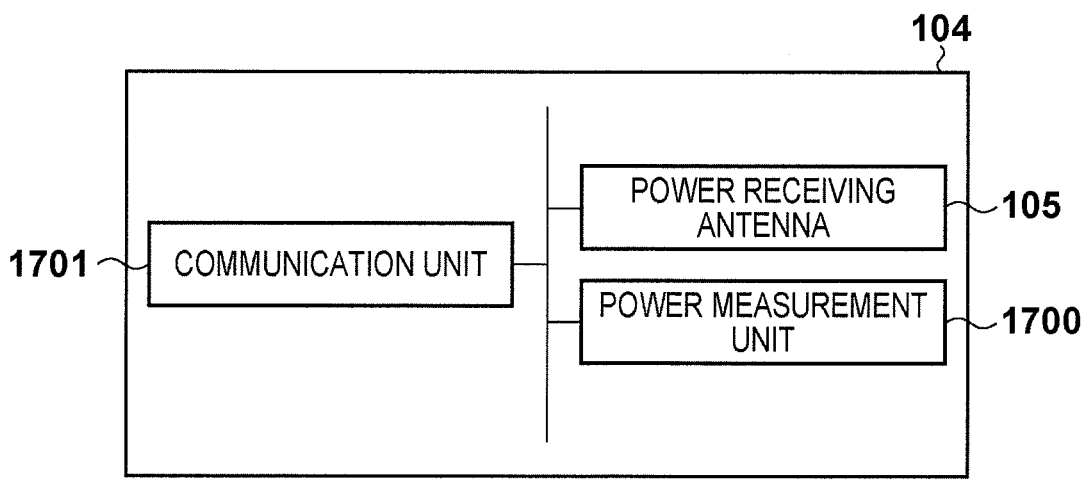

F I G. 6C

| 500 | POSITION | 0 | 1 | 2 | 3 | 4 |
|---|---|---|---|---|---|---|
| 1800 | CAPACITANCE (pF) | 31 | 32 | 33 | 34 | 35 |

F I G. 6D

| | MINIMUM |
|---|---|
| 2000 RECEIVED POWER | 0.8W |

F I G. 6E

| 2100 | MINIMUM | MAXIMUM |
|---|---|---|
| 2101 CAPACITANCE (pF) | 25 | 35 |

F I G. 6F

| 500 | POSITION | 0 | 1 | 2 | 3 | 4 |
|---|---|---|---|---|---|---|
| 2200 | DIFFERENCE (pF) | +1 | | | | |

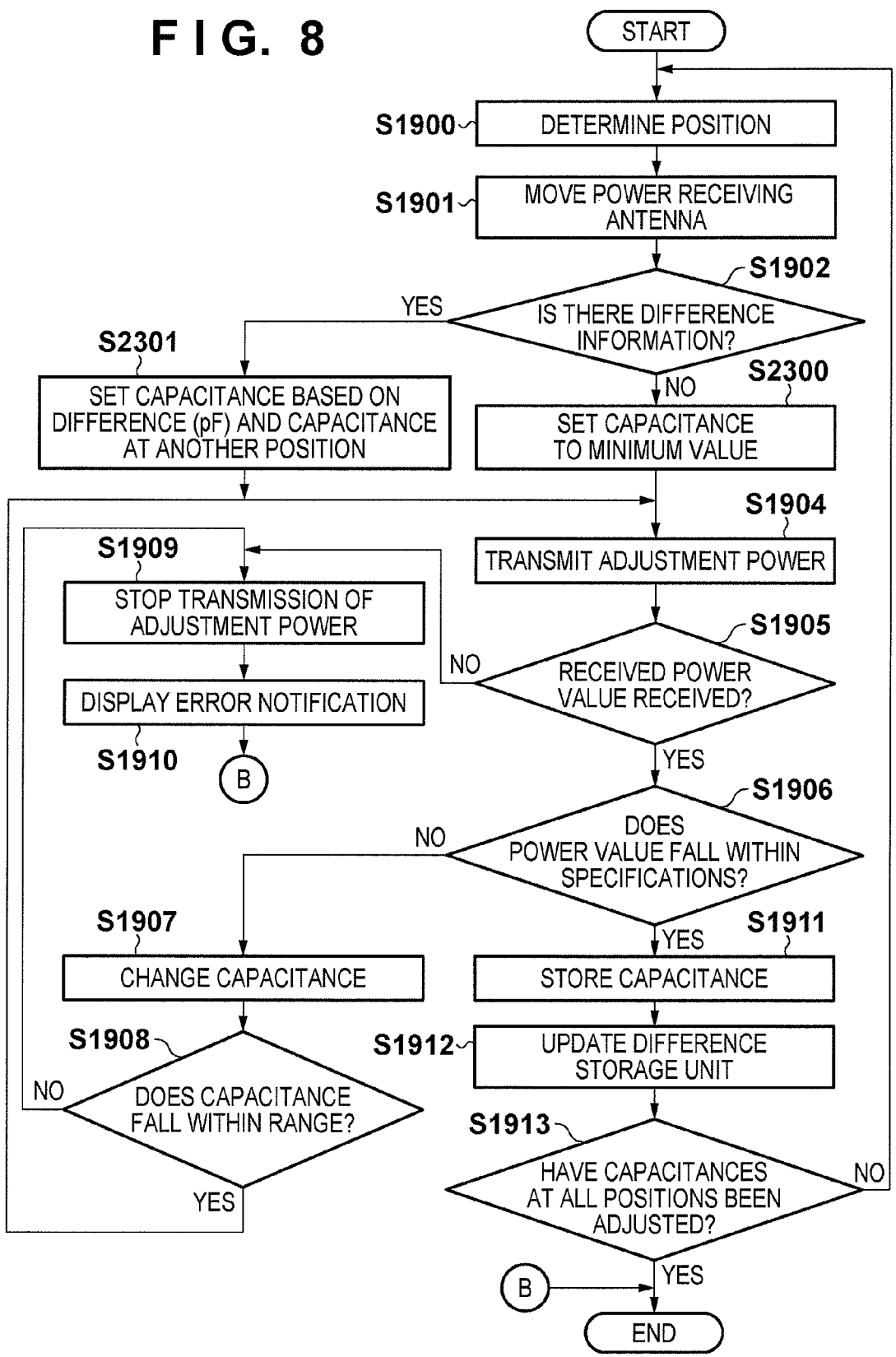

FIG. 9A

| 500 → POSITION | 0 | 1 | 2 |
|---|---|---|---|
| 2400 → CAPACITANCE (pF) | 30 | | |
| 2401a → DIFFERENCE (pF) | – | | |

FIG. 9B

| 500 → POSITION | 0 | 1 | 2 |
|---|---|---|---|
| 2400 → CAPACITANCE (pF) | 30 | 31 | |
| 2401b → DIFFERENCE (pF) | – | +1 | |

FIG. 9C

| 500 → POSITION | 0 | 1 | 2 |
|---|---|---|---|
| 2400 → CAPACITANCE (pF) | 30 | 31 | 32 |
| 2401c → DIFFERENCE (pF) | – | +1 | +2 |

POWER TRANSMITTING APPARATUS, POWER TRANSFER SYSTEM, CONTROL METHOD FOR POWER TRANSMITTING APPARATUS, AND STORAGE MEDIUM

BACKGROUND OF THE INVENTION

1. Field of the Invention

The present invention relates to a power transmitting apparatus, a power transfer system, and a control method for the power transmitting apparatus.

2. Description of the Related Art

There is known a wireless power transfer system for generating an alternating current in a power transmitting antenna, and transferring the power to a power receiving antenna. Japanese Patent Laid Open No. 2010-051137 discloses that the efficiency becomes high when the resonance frequency of a power transmitting antenna coincides with that of a power receiving antenna, and also discloses a technique of controlling a resonance frequency and detecting a frequency at which power transmission efficiency is high. US-2008-0297107 discloses a technique of controlling the resonance frequency of a power transmitting antenna after detecting a decrease in power transfer efficiency due to a change in relative positional relationship between the power transmitting antenna and a power receiving antenna, thereby preventing the power transfer efficiency from constantly decreasing.

SUMMARY OF THE INVENTION

Even if the relative positional relationship between a power transmitting antenna and a power receiving antenna changes, it is important for a wireless power transfer system to maintain high power transfer efficiency. Japanese Patent Laid Open No. 2010-051137, however, does not disclose processing when the power transfer efficiency decreases. In US-2008-0297107, the resonance frequency is controlled after detecting a decrease in power transfer efficiency, and therefore, the power transfer efficiency temporarily drops.

The present invention has been made in consideration of the above problems, and to suppress a decrease in power transfer efficiency even when the relative positional relationship between a power transmitting antenna and a power receiving antenna changes.

According to one aspect of the present invention, there is provided a power transmitting apparatus which has a power transmitting antenna, and transfers power from the power transmitting antenna to a power receiving antenna, comprising: a storage unit configured to be associated with a position of the power receiving antenna, and to store a parameter for controlling a resonance frequency of the power transmitting antenna; a determination unit configured to determine the position of the power receiving antenna; and a control unit configured to control the resonance frequency of the power transmitting antenna based on the position of the power receiving antenna determined by the determination unit and the parameter stored in the storage unit.

According to the present invention, it is possible to suppress a decrease in power transfer efficiency even when the relative positional relationship between a power transmitting antenna and a power receiving antenna changes.

Further features of the present invention will become apparent from the following description of exemplary embodiments (with reference to the attached drawings).

BRIEF DESCRIPTION OF THE DRAWINGS

FIG. 2A is a block diagram showing the configuration of a power transmitting unit;

FIG. 2B is a table showing an example of a storage unit;

FIG. 2C is a timing chart for explaining timings of a movement control unit and a resonance frequency control unit;

FIG. 3C shows tables for explaining an example of a timing storage unit;

FIG. 5A is a view showing a system configuration when the power receiving antenna linearly moves;

FIG. 5B is a view showing a case in which the power transmitting antenna is arranged in the middle of the moving range of the power receiving antenna;

FIG. 5C is a table showing an example of the storage unit in the system configuration example shown in FIG. 5A;

FIG. 5D is a table showing an example of the storage unit in the system configuration example shown in FIG. 5B;

FIG. 5E is a table showing an example of the storage unit when the moving range of the power receiving antenna is divided into a plurality of areas;

FIG. 5F is a view showing a system configuration when there are a plurality of power transmitting antennas and power receiving antennas;

FIG. 6A is a block diagram showing the configuration of a power transmitting unit according to the second embodiment;

FIG. 6B is a block diagram showing the configuration of a power receiving unit according to the second embodiment;

FIG. 6C is a table showing an example of a storage unit after adjustment processing;

FIG. 6D is a table showing an example of a received power specifications storage unit;

FIG. 6E is a table showing an example of a capacitance storage unit;

FIG. 6F is a table showing an example of a difference storage unit;

FIG. 8 is a flowchart for explaining a processing procedure of the adjustment unit when design values are not held; and FIGS. 9A to 9C are tables each showing an example of the difference storage unit when design values are not held.

DESCRIPTION OF THE EMBODIMENTS (First Embodiment)

Figure 1A:
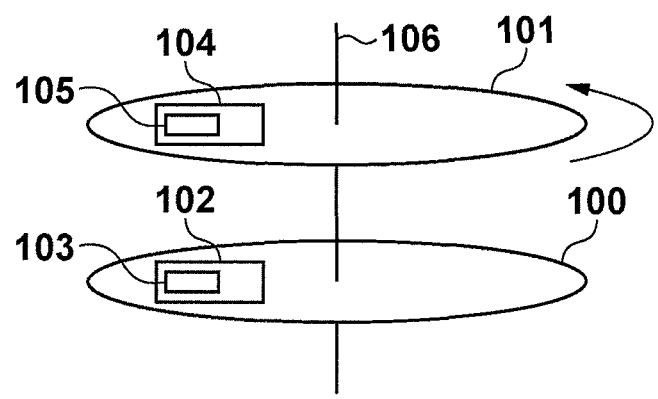
FIG. 1A is a view showing the configuration of a system according to the first embodiment.

In the first embodiment, movement control and resonance frequency control in a system for transferring power from a power transmitting apparatus (to be referred to as a power transmitting unit hereinafter) to the power receiving antenna of a power receiving apparatus (to be referred to as a power receiving unit hereinafter) which moves along a known trajectory will be described. An example of the system includes a system for transferring a power from a fixed lower unit (the power transmitting side) like a network camera to a rotatable upper unit (the power receiving side) including a camera. FIG. 1A is a view showing the configuration of a system according to this embodiment. Reference numeral 100 denotes a lower unit of a network camera. Although not shown, the lower unit 100 includes a power transmitting unit 102 for transferring a power to an upper unit 101 in addition to a CPU, a memory, and a motor for rotating the upper unit. The power transmitting unit 102 has a power transmitting antenna 103. A power receiving unit 104 has a power receiving antenna 105 for receiving a power transmitted from the power transmitting antenna 103. Reference numeral 106 denotes a rotation axis of the upper unit 101. The power receiving unit 104 and power receiving antenna 105 rotate about the rotation axis 106.

Figure 1B:
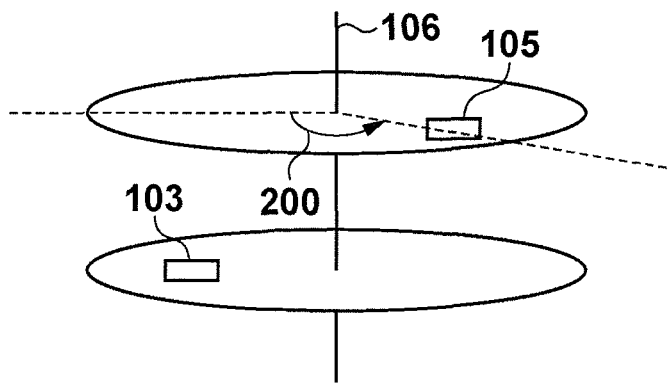
FIG. 1B is a view showing the movement of the position of a power receiving antenna.

FIG. 1B is a view showing the movement of the position of the power receiving antenna 105, and shows a case in which the upper unit 101 rotates about the rotation axis 106. Referring to FIG. 1B, the upper unit 101 has rotated, and the power receiving antenna 105 has rotated about the rotation axis 106 by an angle 200. In this embodiment, the angle 200 is used as position information of the power receiving antenna 105.

Figure 1C:
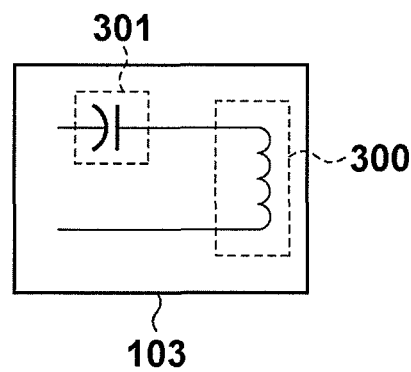
FIG. 1C is a circuit diagram showing the configuration of a power transmitting antenna.

FIG. 1C is a circuit diagram showing the configuration of the power transmitting antenna 103 applicable to this embodiment. The power transmitting antenna 103 includes an inductor 300 and a variable capacitor (to be referred to as a variable C hereinafter) 301, and constitutes an LC resonator. In this embodiment, the resonance frequency of the power transmitting antenna 103 is controlled by controlling the static capacitance (to be simply referred to as a capacitance hereinafter) of the variable C 301 as a capacitance element parameter.

FIG. 2A is a block diagram showing the configuration of the power transmitting unit 102 applicable to this embodiment. Reference numeral 400 denotes an alternating current generation unit. A generated alternating current is supplied to the power transmitting antenna 103. A movement control unit 401 causes a motor (not shown) to rotate the upper unit 101. A storage unit 402 stores, in association with each other, the position information of the power receiving antenna 105 and a capacitance (the capacitance element parameter) of the variable C 301 for obtaining high efficiency at the position of the antenna 105. A speed storage unit 404 stores a movement speed at which the movement control unit 401 moves the upper unit 101. In this embodiment, the speed storage unit 404 stores time information (to be simply referred to as a time hereinafter) required to move the upper unit 101 (the power receiving unit) by 1°. A response time storage unit 405 stores a time from when the capacitance of the variable C 301 is changed until the capacitance becomes stable. A timing determination unit 403 determines a timing of changing the capacitance of the variable capacitor based on information of the speed storage unit 404, the response time storage unit 405, and a detection unit 409 (to be described later). The timing determination unit 403 stores the determined timing in a timing storage unit 406. A resonance frequency control unit 407 controls the capacitance of the variable C 301 based on the information of the timing storage unit 406. The timing determination unit 403 controls a timer 408. When a time-out of the timer 408 occurs, the resonance frequency control unit 407 sets the capacitance of the variable C 301. The detection unit 409 detects movement information of the upper unit 101 (the power receiving unit).

FIG. 2B is a table showing an example of the storage unit 402 applicable to this embodiment. The storage unit 402 stores, in association with each other, an angle 500 serving as position information of the power receiving antenna 105 and a capacitance 501 of the variable C 301 for obtaining high power transfer efficiency at the movement position of the power receiving antenna 105. Referring to FIG. 2B, the capacitance of the variable C 301 for obtaining high efficiency at a position to which the power receiving antenna 105 has moved by 1° is 31 pF, and the capacitance for obtaining high efficiency at a position to which the antenna 105 has moved by 2° is 32 pF. In this embodiment, the moving unit of the upper unit 101 is 1°, and the storage unit 402 stores a capacitance per moving unit.

FIG. 2C is a timing chart for explaining timings of the movement control unit 401 and the resonance frequency control unit 407 both of which are applicable to this embodiment. The abscissa represents time. A case in which the movement control unit 401 moves the upper unit 101 from an angle of 0° to 2° in FIG. 2B will be explained with reference to FIG. 2C. Ta (600 or 601) represents information (first time information) about a moving time required for the movement control unit 401 to move the upper unit 101 by 1°, that is, the value stored in the speed storage unit 404. Referring to FIG. 2C, at a time t1, the power receiving antenna 105 has moved by 1°. At a time t2, the power receiving antenna 105 has moved by 2°. Tb (602 or 603) represents the time stored in the response time storage unit 405, that is, time information (second time information) until the resonance frequency of the power transmitting antenna becomes stable. This means that when the resonance frequency control unit 407 sets the capacitance of the variable C 301 to 31 pF at a time t3, the capacitance of the variable C 301 becomes stable at 31 pF at the time t1 when the time Tb elapses from the time t3. Similarly, if the capacitance of the variable C 301 is set to 32 pF at a time t4, it becomes stable at 32 pF at the time t2 when the time Tb elapses from the time t4.

Tc (604) and Ta (605) represent time-out values (to be referred to as TO values hereinafter) to be set in the timer 408. The TO value Tc is used to generate a timing for the resonance frequency control unit 407 to set the capacitance of the variable C 301 to 31 pF corresponding to an angle of 1° in FIG. 2B, and Tc=Ta−Tb. The resonance frequency control unit 407 sets the capacitance of the variable C 301 to 31 pF when a time-out of the timer 408 set with the TO value Tc occurs. The TO value Ta is used for the resonance frequency control unit 407 to set the capacitance of the variable C 301 to 32 pF corresponding to an angle of 2° in FIG. 2B. If the speed at which the upper unit 101 moves from an angle of 0° to 2° is constant, the TO value Ta is equal to the value stored in the speed storage unit 404. When a time-out of the timer 408 set with the TO value Ta occurs (at the time t4), the resonance frequency control unit 407 sets the capacitance of the variable C 301 to 32 pF. As shown in FIG. 2C, the operation timing (604 or 605) of the resonance frequency control unit 407 is determined based on the moving time (Ta) of the upper unit 101. When the power receiving antenna 105 moves, therefore, it is possible to set the resonance frequency of the power transmitting antenna 103 to obtain high efficiency.

Figure 3A:
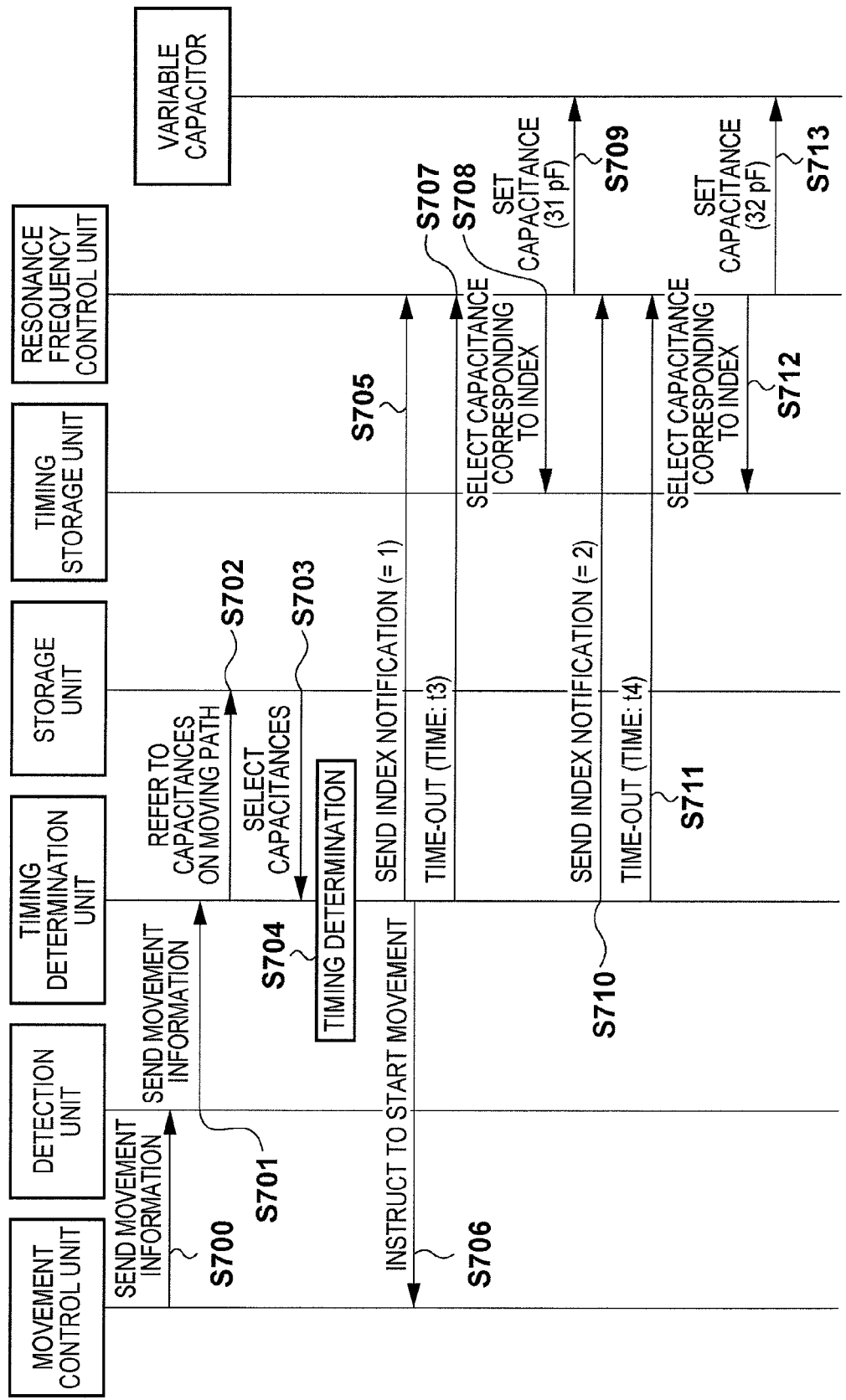
FIG. 3A is a sequence chart showing processing of a power transmitting unit according to the first embodiment.
Figure 3B:
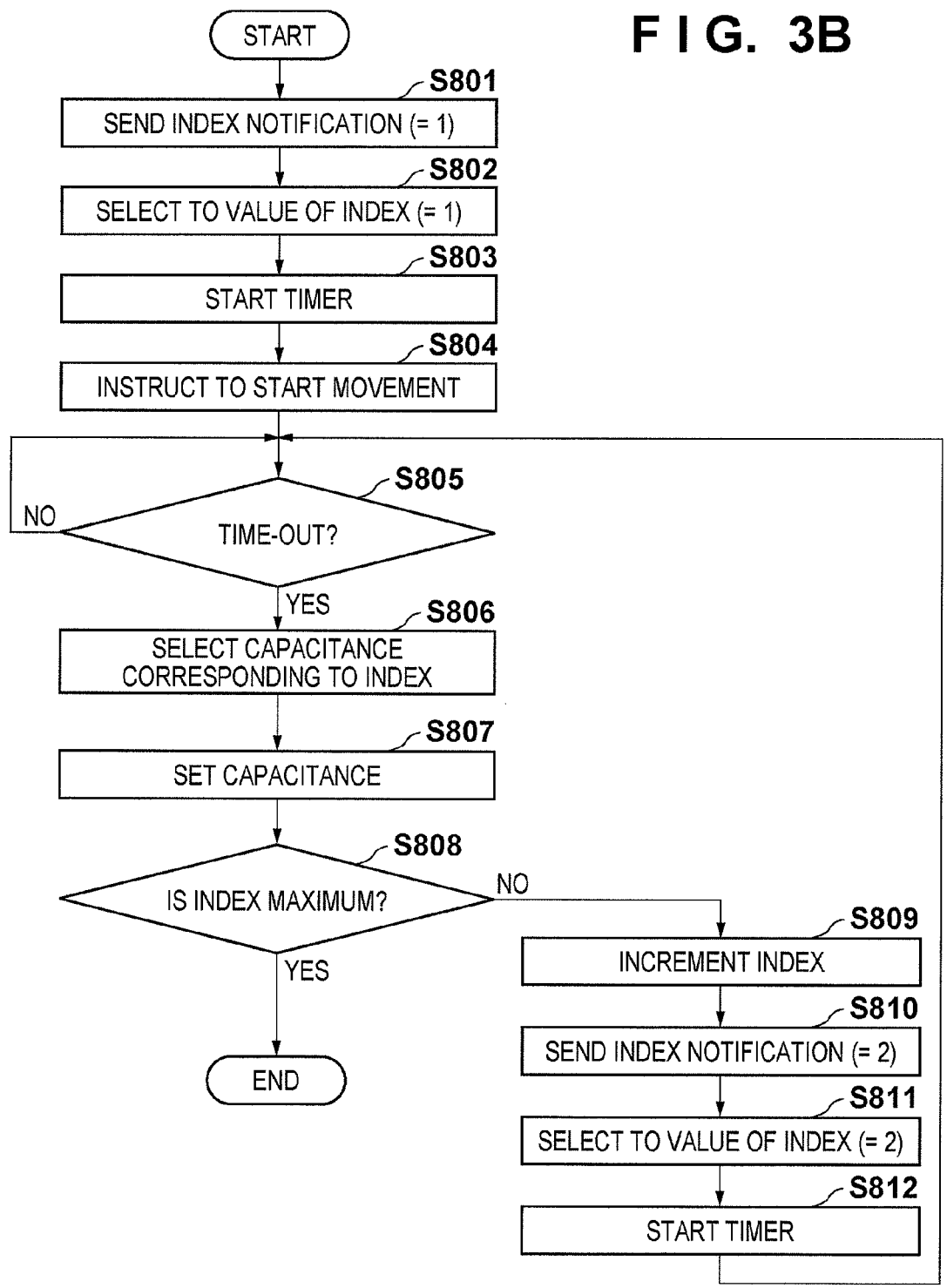
FIG. 3B is a flowchart for explaining a processing procedure of the power transmitting unit according to the first embodiment.

FIG. 3A is a sequence chart showing processing of the power transmitting unit 102 applicable to this embodiment. FIG. 3B is a flowchart for explaining a processing procedure of the power transmitting unit 102 applicable to this embodiment, and explaining the operation of the timing determination unit 403 and the resonance frequency control unit 407. FIG. 3C shows tables for explaining an example of the timing storage unit 406 applicable to this embodiment. Reference numeral 901 denotes position information (an angle) of the power receiving antenna 105; and 902, the capacitance of the variable C 301. The timing determination unit 403 acquires the position information (angle) 901 and capacitance 902 from the storage unit 402 based on the movement information of the power receiving antenna 105. Reference numerals 903a and 903b denote TO values to be set in the timer 408 by the timing determination unit 403; and 900, an index of the position information (angle) 901, the capacitance 902, and TO value 903a or 903b.

Figure 4A:
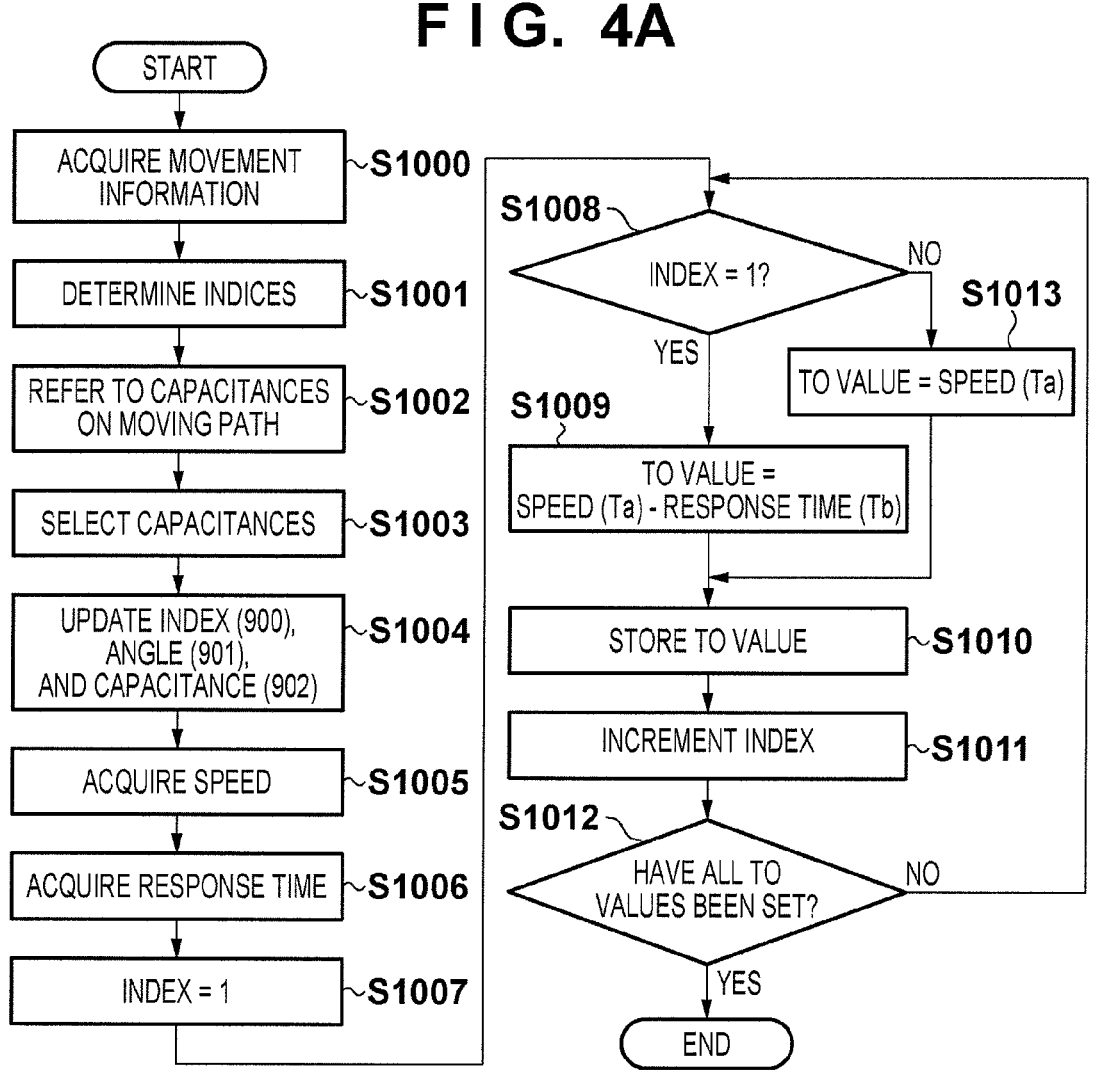
FIG. 4A is a flowchart for explaining a processing procedure of a timing determination unit.

FIG. 4A is a flowchart for explaining a processing procedure as one operation of the timing determination unit 403 applicable to this embodiment when creating the timing storage unit 406. A case in which the upper unit 101 moves from an angle of 0° to 2° will be described with reference to the sequence chart of FIG. 3A and the flowcharts of FIGS. 3B and 4A.

In step S700, the movement control unit 401 determines angles of 1° and 2° as a predetermined moving amount of the upper unit 101, and notifies the detection unit 409 of them as movement information. Upon receiving the movement information, the detection unit 409 transmits it to the timing determination unit 403 (S701).

Timing determination (S704) of the timing determination unit 403 and resonance frequency control unit 407 for implementing the operation shown in FIG. 2C will be explained with reference to the flowchart of FIG. 4A. Upon acquiring the movement information (S701 and S1000), the timing determination unit 403 determines the number of indices 900 to be stored in the timing storage unit 406. The number of indices is equal to that of movement positions acquired from the movement information. In this case, since the movement information indicates that the upper unit 101 moves to an angle of 1° and to an angle of 2°, the number of indices is "2" (S1001). The timing determination unit 403 refers to the storage unit 402 to determine the capacitances (501) corresponding to the angles of 1° and 2° on the moving path of the upper unit 101 (S702 and S1002). The timing determination unit 403 selects and determines "31" and "32" as capacitances corresponding to the indices of the movement information (S703 and S1003). The timing determination unit 403 stores, in the timing storage unit 406, the indices, angles, and capacitances acquired in steps S1000 to S1003, and updates the timing storage unit 406 (S1004). FIG. 3C shows the status of the timing storage unit 406 at this time. Since the TO values (903a) have not been determined at this time, columns corresponding to them are blank.

The timing determination unit 403 (the first acquisition unit) acquires the moving time (Ta) corresponding to speed information from the speed storage unit 404 to determine the TO value (903a) (S1005). The timing determination unit 403 then acquires the response time Tb of the variable C 301 from the response time storage unit 405 (S1006). The timing determination unit 403 stores "1" as the first index to set the TO value 903a (S1007).

Since the stored index is "1" (YES in step S1008), the timing determination unit 403 determines a TO value to be set by calculating Ta−Tb (S1009). As already described with reference to FIG. 2C, Ta−Tb=Tc. The timing determination unit 403 sets "Tc" as a TO value corresponding to the index "1" (903b).

The timing determination unit 403 increments the index (S1011), and determines whether all TO values have been set (S1012). The timing determination unit 403 has not set a TO value for the index "2" (the maximum index) of the timing storage unit 406 in step S1010. The timing determination unit 403, therefore, determines that not all the TO values have been set (NO in step S1012). In step S1008, it is determined whether the index is "1". Since the timing determination unit 403 has incremented the index in step S1011, the index is "2" (NO in step S1008). In this case, the timing storage unit 406 determines Ta as a TO value corresponding to the index "2" (S1013), and stores the TO value (S1010). Since all the TO values have been set this time (YES in step S1012), the timing determination processing ends. FIG. 3C shows the timing storage unit 406 at this time. If the timing determination unit 403 and resonance frequency control unit 407 operate according to FIG. 3C, the timing determination unit 403 sets Tc as a TO value in the timer 408 when the index is "1". When a time-out of the timer 408 occurs, the resonance frequency control unit 407 can set "31 pF" as the capacitance of the variable C 301. Similarly, when the index is "2", the timing determination unit 403 sets Ta as a TO value in the timer 408. When a time-out of the timer 408 occurs, the resonance frequency control unit 407 can set "32 pF" as the capacitance of the variable C 301. It is, therefore, possible to perform the operation described with reference to FIG. 2C.

If the timing is determined in step S704, the timing determination unit 403 and resonance frequency control unit 407 operate according to the flowchart of FIG. 3B. The timing determination unit 403 notifies the resonance frequency control unit 407 of the first index (=1) referred to in the timing storage unit 406 (FIG. 3C) (S705 and S801). The timing determination unit 403 refers to the storage unit shown in FIG. 3C to select the TO value (=Tc) for which the index is "1" (S802), and starts the timer 408 (S803). At the same time, the timing determination unit 403 sends a movement start instruction to the movement control unit 401 (S706 and S804). At this time, the relationship among the movement control unit 401, the resonance frequency control unit 407, and the timer 408 corresponds to a time 0 in FIG. 2C.

A time-out of the timer 408 set with the TO value (=Tc) occurs (YES in step S805), the resonance frequency control unit 407 selects, from the timing storage unit 406 (FIG. 3C), a capacitance (31 pF) corresponding to the index (=1) sent in step S705 (S806). The resonance frequency control unit 407 then sets the capacitance of the variable C 301 to the selected capacitance "31 pF" (S709 and S807). The relationship among the movement control unit 401, the resonance frequency control unit 407, and the timer 408 corresponds to the time t3 in FIG. 2C. If the capacitance of the variable C 301 is set to 31 pF at the time t3, it becomes stable at the time t1 when the time Tb elapses. Since the power receiving antenna 105 moves to an angle of 1° at the time t1, the wireless power transfer system shown in FIGS. 1A to 1C can achieve high power transfer efficiency. The power transmitting unit then transmits a power from the power transmitting antenna 103 of the variable C 301 set by the resonance frequency control unit 407.

The timing determination unit 403 determines whether the index sent to the resonance frequency control unit 407 is maximum (S808). The timing determination unit 403 has notified the resonance frequency control unit 407 of the index "1" (the current index) in steps S705 and S801. A maximum index value stored in the storage unit shown in FIG. 3C is "2". The timing determination unit 403, therefore, determines that the index is not maximum (NO in step S808), and increments the index "1" to "2" (S809). The timing determination unit 403 notifies the resonance frequency control unit 407 of the index (=2) (S710 and S810). Then, the timing determination unit 403 refers to the storage unit shown in FIG. 3C to select a TO value (=Ta) for which the index is "2" (S811), and starts the timer 408 (S812).

When a time-out of the timer 408 set with the TO value (=Ta) (YES in step S805 and step S711), the resonance frequency control unit 407 selects a capacitance (902) (=32 pF) corresponding to the index (=2) sent in step S710 (S712). The resonance frequency control unit 407 sets the capacitance of the variable C 301 to the selected capacitance "32 pF" (S713). The relationship among the movement control unit 401, the resonance frequency control unit 407, and the timer 408 at this time corresponds to the time t4 in FIG. 2C. If the capacitance of the variable C 301 is set to 32 pF at the time t4, it becomes stable at the time t2 when the time Tb elapses. At this time (the time t2), the power receiving antenna 105 moves to an angle of 2°, and therefore, the wireless power transfer system shown in FIGS. 1A to 1C can achieve high power transfer efficiency. The power transmitting unit transmits a power from the power transmitting antenna 103 of the variable C 301 set by the resonance frequency control unit 407.

When the capacitance is set in step S713, the timing determination unit 403 determines whether the index sent to the resonance frequency control unit 407 is the maximum (S808). The timing determination unit 403 has notified the resonance frequency control unit 407 of the index "2" in steps S710 and S810. A maximum index value stored in the storage unit shown in FIG. 3C is "2". The timing determination unit 403, therefore, determines that the index is the maximum (YES in step S808), the processing according to FIG. 3B ends.

The detection unit 409 detects movement information of the upper unit 101 (the power receiving antenna 105) (S700), and the resonance frequency control unit 407 controls the resonance frequency of the power transmitting antenna 103 based on the detection result and information stored in the storage unit 402 of FIG. 2B. This enables to prevent a decrease in efficiency even when the power receiving antenna 105 moves.

Although the system in which the power receiving antenna 105 moves as shown in FIG. 1A has been exemplified, the present invention is not limited to this. For example, a system in which at least one of the power receiving antenna 105 and the power transmitting antenna 103 moves may be possible. Furthermore, although the variable C 301 and resonance frequency control unit 407 are incorporated in the power transmitting antenna 103, as shown in FIG. 1C, they may be included in the power receiving antenna 105.

Figure 4B:
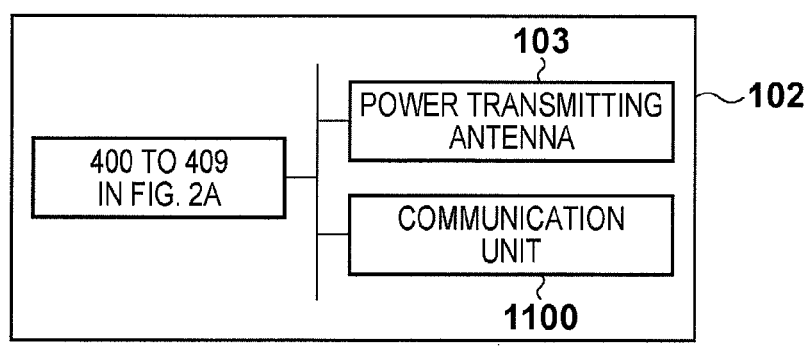
FIG. 4B is a block diagram showing a configuration example of the power transmitting unit having a communication unit (transmitted power communication unit)

The resonance frequency control unit 407 may be incorporated in the power transmitting unit 102 and the variable C 301 may be incorporated in the power receiving unit 104. Alternatively, the resonance frequency control unit 407 may be incorporated in the power receiving unit 104 and the variable C 301 may be incorporated in the power transmitting unit 102. If, for example, the resonance frequency control unit 407 is incorporated in the power transmitting unit 102 and the variable C 301 is incorporated in the power receiving unit 104, a communication unit 1100 (a transmitted power communication unit) is provided in the power transmitting unit 102, as shown in FIG. 4B. The communication unit 1100 (the transmitted power communication unit) may instruct, via the power transmitting antenna 103, the power receiving unit 104 to set a capacitance, and the power receiving unit 104 may set the capacitance of the variable C 301 in steps S709 and S713.

Although a case in which the power receiving antenna 105 rotates, as shown in FIGS. 1A and 1B, has been described in this embodiment, the antenna 105 may linearly move. FIG. 5A is a view showing a system configuration when the power receiving antenna 105 moves linearly. The power transmitting antenna 103 is fixed on a substrate 1201. The power receiving antenna 105 moves from position "0" to position "4" on an arrow 1203 by one step. The power transmitting antenna 103 is arranged directly below position "0" (which is indicated by a dotted line 1200a in FIG. 5A). Each of FIGS. 5C and 5D shows an example of the storage unit 402. FIG. 5C shows an example of the storage unit 402 in the system configuration of FIG. 5A. The storage unit 402 stores the capacitance (1301a) at each position (1300a). Referring to FIG. 5B, the position of the power transmitting antenna 103 is set in the middle of the moving range of the power receiving antenna 105 (which is indicated by a dotted line 1200b in FIG. 5B). With this arrangement, for a position within the moving range, which is symmetrical to the position of the power receiving antenna 105 with respect to the arrangement position (1200b), the capacitances (1301a) at the symmetrical positions can be deemed equal to each other, thereby decreasing the storage amount of the storage unit 402. Referring to FIG. 5B, the power transmitting antenna 103 is arranged directly below position "2" (which is indicated by the dotted line 1200b) between positions "0" and "4" on the arrow 1203, that is, in the middle of the moving range of the power receiving antenna 105. With this arrangement, with respect to the power transmitting antenna 103, positions "1" and "3" on the arrow 1203 are symmetrical. It is, therefore, possible to use common capacitances at positions "1" and "3" which are symmetrical with respect to position "2" as the arrangement position of the power transmitting antenna 103, as shown in FIG. 5D. Similarly, since it is also possible to use common capacitances at positions "0" and "4", it is possible to reduce the storage amount of the storage unit 402 of FIG. 5D as compared with FIG. 5C.

Although a capacitance is stored in the storage unit 402 for each movement step (every angle of 1° in FIG. 1B) in FIGS. 1B, 5C and 5D, it may be stored in the storage unit 402 for each of a plurality of areas into which the moving range is divided. FIG. 5E shows an example of the storage unit 402. An area 1401 is "1" when an angle 1400 falls within the range from 0° to 2°. The area 1401 is "2" when the angle 1400 falls within the range from 2° to 3°. A capacitance 1402 is then stored for each area. In this case, the area 1401 is substituted for the angle 901 in FIG. 3C, thereby allowing to control the resonance frequency according to the flowchart of FIG. 3B.

In this embodiment, the timing storage unit 406 is created according to the flowchart of FIG. 4A, and the timing determination unit 403 acquires the speed of the power receiving antenna 105 (S1005). This, however, need only be a feature amount associated with movement, and acceleration may be acquired.

The system (FIGS. 1A, 5A, and 5B) including a set of the power transmitting unit 102 and the power receiving unit 104 has been explained in this embodiment. The present invention, however, is applicable to a system including a group of a plurality of power transmitting units and power receiving units. An example of the system includes an articulated robot having a plurality of driving units (motors). FIG. 5F is a view showing a system configuration. A first power transmitting unit 1503 is arranged in a first unit 1500, the motor (not shown) of the first unit moves a second unit 1501. The second unit 1501 is provided with a first power receiving unit 1504, a second power transmitting unit 1505, and a motor for moving a third unit 1502. The third unit 1502 is provided with a second power receiving unit 1506. The first power transmitting unit 1503 transfers a power to the first power receiving unit 1504 and the second power transmitting unit 1505 transfers a power to the second power receiving unit 1506. In this system, a timing storage unit 406 (FIG. 3C) is individually created for each of a set of the first power transmitting unit 1503 and first power receiving unit 1504 and a set of the second power transmitting unit 1505 and second power receiving unit 1506. A resonance frequency control unit 407 included in the first power transmitting unit 1503 or the second power transmitting unit 1505 controls the capacitance of the variable C 301 based on information of the corresponding timing storage unit 406. With this configuration, it is possible to apply the present invention to the system including a plurality of moving units.

According to this embodiment, even if the relative positional relationship between a power transmitting antenna and a power receiving antenna changes, it is possible to provide a wireless power transfer technique which does not temporarily decrease the efficiency.

(Second Embodiment)

In wireless power transfer, the efficiency may drop below a design value depending on the assembly accuracy of an upper unit 101 and a lower unit 100 or the manufacturing accuracy of a power transmitting antenna 103 and a power receiving antenna 105. In the second embodiment, measurement of a storage unit 402 to prevent a decrease in efficiency due to such accuracy variations will be described. FIG. 6A is a block diagram showing the configuration of a power transmitting unit 102 applicable to this embodiment. An adjustment unit 1600 adjusts a capacitance 501 of the storage unit 402 (FIG. 2B) depending on a comparison result of a comparison unit 1605 (to be described later). An adjustment power storage unit 1601 stores a power which is transmitted from the power transmitting antenna 103 in adjustment. In this embodiment, a power of 1 W is transmitted in adjustment. A communication unit 1602 (a second acquisition unit) receives, from a power receiving unit 104, information about a power value received by the power receiving antenna. A received power specifications storage unit 1603 (a reference power storage unit) stores a received power value serving as a criterion of determination whether the adjustment unit 1600 needs to adjust a capacitance. FIG. 6D shows the received power specifications storage unit 1603 (the reference power storage unit). In this embodiment, 0.8 W is stored as a minimum value of the received power (2000). A capacitance storage unit 1604 stores minimum and maximum values of a variable C 301. FIG. 6E shows the capacitance storage unit 1604. The capacitance storage unit 1604 indicates that it is possible to adjust the capacitance of the variable C 301 within the adjustment range from a minimum value of 25 pF to a maximum value of 35 pF. The capacitance storage unit 1604 stores a capacitance to which the capacitance of the variable C 301 can be set for adjusting the resonance frequency based on the manufacturing accuracy of the power receiving antenna and power transmitting antenna 103. The comparison unit 1605 compares the power value received by the communication unit 1602 (the power value received by the power receiving antenna 105) with the value stored in the received power specifications storage unit 1603 (the reference power storage unit), and compares the capacitance of the variable C 301 which has been changed in adjustment with the value stored in the capacitance storage unit 1604. FIG. 6F shows a difference storage unit 1606. The difference storage unit 1606 stores the difference between the capacitances before and after adjustment at each movement position of the power receiving antenna. Referring to FIG. 6F, as an adjustment result at position "0", the capacitance after adjustment is +1 pF as compared with the capacitance before the adjustment. An initial value determination unit 1607 determines, at each position (each movement position of the power receiving unit), an initial value to be set in the variable C 301 in adjustment. FIG. 6B shows the configuration of the power receiving unit 104 applicable to this embodiment. A power measurement unit 1700 measures a power value which has been transmitted from the power transmitting antenna 103 in adjustment, and received by the power receiving antenna 105. A communication unit 1701 (a received power communication unit) transmits the power value measured by the power measurement unit 1700 to the power transmitting unit 102. FIG. 6C shows the storage unit 402 after the adjustment processing of this embodiment is executed.

FIG. 8 is a flowchart illustrating processing of the adjustment unit 1600 applicable to this embodiment. In this embodiment, a case in which the storage unit 402 stores values shown in FIG. 5C as design values before adjustment, and is updated after adjustment, as shown in FIG. 6C, will be described.

First, the adjustment unit 1600 refers to the storage unit 402 shown in FIG. 5C to determine the position of the power receiving antenna 105. The position of the power receiving antenna 105 indicates a relative position of the power receiving antenna 105 with respect to the power transmitting antenna 103. In this case, the position of the antenna 105 is determined as the first position, "0" of FIG. 5C (S1900). The movement control unit 401 moves the power receiving antenna 105 to position "0" (S1901). The adjustment unit 1600 refers to the difference storage unit 1606, and determines whether a difference at an immediately preceding position where adjustment has been performed is stored. Since position "0" is the first adjustment position where adjustment is to be performed, there is no immediately preceding position where adjustment has been performed (NO in step S1902). The initial value determination unit 1607 refers to the storage unit shown in FIG. 5C which stores the design values, and sets the capacitance of the variable C 301 to 30 pF corresponding to position "0" (S1903). The power transmitting unit transmits a power of 1 W stored in the adjustment power storage unit 1601 from the power transmitting antenna 103 (S1904).

The power receiving unit 104 receives the power transmitted in step S1904, and notifies the power transmitting unit 102 of the received poser value via the communication unit 1701 (the received power communication unit) after the power measurement unit 1700 measures the received power value. If the power transmitting unit 102 receives the notification (YES in step S1905), the comparison unit 1605 compares the received value with the value stored in the received power specifications storage unit 1603 (the reference power storage unit). Assume that the notification received in step S1905 indicates a power of 0.6 W. The comparison unit 1605 determines that the received power is 0.6 W, and falls outside the received power specifications (FIG. 6D) indicating a minimum value of 0.8 W (NO in step S1906). Note that the present invention is not limited to this example, and it is possible to store a maximum value of the received power in the received power specifications storage unit 1603 (the reference power storage unit) (2000). In this case, if the received power exceeds the maximum value, the comparison unit 1605 determines that the received power falls outside the specifications (NO in step S1906).

The adjustment unit 1600 changes the capacitance of the variable C 301 according to the comparison result of the comparison unit 1605 (S1907), transmits the adjustment power again, and receives a received power value. A capacitance changing algorithm will not explained in detail. For example, the capacitance of the variable C 301 (the capacitance element parameter) is adjusted by adding an adjustment capacitance (an adjustment capacitance parameter) to the capacitance of the variable C 301 (the capacitance element parameter). Alternatively, the capacitance of the variable C 301 (the capacitance element parameter) is adjusted by subtracting an adjustment capacitance (an adjustment capacitance parameter) from the capacitance of the variable C 301 (the capacitance element parameter). There is provided, for example, a method of increasing/decreasing the capacitance of the variable C 301 by a minimum step (for example, 1 pF) as a changeable adjustment capacitance (adjustment capacitance parameter). Assume that the capacitance is changed from 30 pF set in step S1903 to 31 pF (S1907).

The comparison unit 1605 determines whether the capacitance changed in step S1907 falls within the capacitance range stored in the capacitance storage unit 1604. Referring to FIG. 6E, the capacitance of the variable C 301 is settable within the range from a minimum value of 25 pF to a maximum value of 35 pF, and therefore, 31 pF set in step S1907 falls within the range (YES in step S1908). The power transmitting unit 102 transmits the adjustment power again in step S1904. After the power transmitting unit 102 receives a received power value in step S1905, the comparison unit 1605 determines whether the received power value falls within the usage range. Assume that the power transmitting unit 102 has received a notification indicating a received power value of 1 W. The received power specifications indicate a minimum value of 0.8 W, and therefore, the notification satisfies the specifications (YES in step S1906). Thus, the adjustment unit 1600 updates the capacitance corresponding to position "0" in the storage unit 402 with a capacitance of 31 pF (denoted by reference numeral 1800 of FIG. 6C) (S1911). Then, the adjustment unit 1600 stores the difference between the capacitances before and after the adjustment in the difference storage unit 1606. Referring to FIG. 5C, the capacitance at position "0" is 30 pF. On the other hand, since the current capacitance is 31 pF, the adjustment unit 1600 stores a difference of +1 pF in a difference 2200 corresponding to position "0" in the difference storage unit 1606 (FIG. 6F), and updates the difference storage unit 1606 (S1912). FIG. 6F shows the status of the difference storage unit 1606 at this time.

The adjustment unit 1600 determines whether capacitances at all positions on an arrow 1203 of FIG. 5A have been adjusted. Referring to the difference storage unit 1606 (FIG. 6F), only the difference 2200 corresponding to position "0" has been updated. The unit 1600, therefore, determines that not all the capacitances at the positions have been adjusted (NO in step S1913). The adjustment unit 1600 changes the position of the power receiving antenna from position "0" to "1", and adjusts the capacitance at position "1".

In step S1902, the adjustment unit 1600 determines whether there is the difference (2200) at position "0" immediately preceding the current position, "1". Referring to FIG. 6F, the difference corresponding to position "0" has been stored (YES in step S1902). In this case, the adjustment unit 1600 determines an initial capacitance value when starting adjustment at position "1" as follows. That is, the unit 1600 refers to the difference at the position (position "0") immediately preceding position "1" in the difference storage unit 1606, and acquires information indicating that the difference is +1 pF. After that, the unit 1600 refers to the storage unit shown in FIG. 5C, and acquires information indicating that the capacitance design value at position "1" is 31 pF. Then, the initial value determination unit 1607 sets, as an initial value in adjustment at position "1", the capacitance of the variable C 301 to 32 pF obtained by adding the difference (+1 pF) at the immediately preceding position to the design value (31 pF) at position "1" (S1914). Variations in capacitance (1800) at respective positions due to the manufacturing accuracy of the power transmitting antenna 103 and power receiving antenna 105 are expected to have common characteristics. If the initial value determination unit 1607 determines an initial capacitance value at the current position based on the difference 2200 at the immediately preceding position and the design value of FIG. 5C, it is possible to shorten the adjustment time. If, for example, the difference at position "0" is +1 pF, as shown in FIG. 6F, the difference at position "1" can be expected to also be +1 pF. In this case, assume that adjustment processing is executed according to a flowchart shown in FIG. 7 at position "1". If the design value (31 pF) is set as an initial capacitance value in step S1903, it is necessary to execute processing in steps S1904 to S1908, and then execute processing in steps S1904 to S1906 again. If, however, the initial value is set to 32 pF based on the difference and the design value, the processing in steps S1904 to S1908 need not be repeated.

In step S1904, the initial value determination unit 1607 sets the initial capacitance value to 32 pF based on the difference and the design value, and transmits an adjustment power. If the received power value received by the power transmitting unit 102 in step S1905 is 1 W, the power value falls within the specifications (YES in step S1906). In step S1911, the adjustment unit 1600 stores 32 pF as a capacitance 1800 corresponding to position "2" of the storage unit 402 (FIG. 6C). By executing the above operation at positions "3" and "4", the storage unit 402 is updated, as shown in FIG. 6C.

If the received power value cannot be received from the power receiving unit 104 in step S1905 (NO in step S1905), the adjustment unit 1600 determines that the power receiving unit 104 does not operate due to a failure or the like, and stops transmission of the adjustment power (S1909). The unit 1600, for example, displays an error notification on a UI unit (not shown), and ends the adjustment processing. If the capacitance changed in step S1907 falls outside the range stored in the capacitance storage unit 1604 (FIG. 6E), the unit 1600 determines that a tolerance of the capacitance is exceeded for some reason, stops transmission of the adjustment power (S1909), and displays an error notification on the UI unit (not shown) to end the adjustment processing.

In this embodiment, to prevent a decrease in efficiency due to the assembly accuracy or manufacturing accuracy of the power transmitting antenna 103 and the power receiving antenna 105, the storage unit 402 is adjusted based on the design values in FIG. 5C. Furthermore, an initial value to be set in the variable C 301 in adjustment at each position is determined based on difference information between a design value and an adjusted capacitance at a position where adjustment has been performed, thereby enabling to shorten the adjustment time.

There is also another method of shortening the adjustment time. Adjustment may be performed at positions "0" and "4", and an initial value to be set in the variable C 301 in adjustment at another position may be determined by interpolating difference information at another position based on difference information at a plurality of positions. Assume, for example, that interpolation is performed based on difference information at positions "0" and "4". In this case, if the difference at position "0" is +1 pF and the difference at position "4" is 5 pF, it is possible to perform interpolation and determine an initial value at position "1" as a design value+2 pF, an initial value at position "2" as a design value (a value in FIG. 5B)+3 pF, and an initial value at position "3" as a design value+4 pF.

Figure 7:
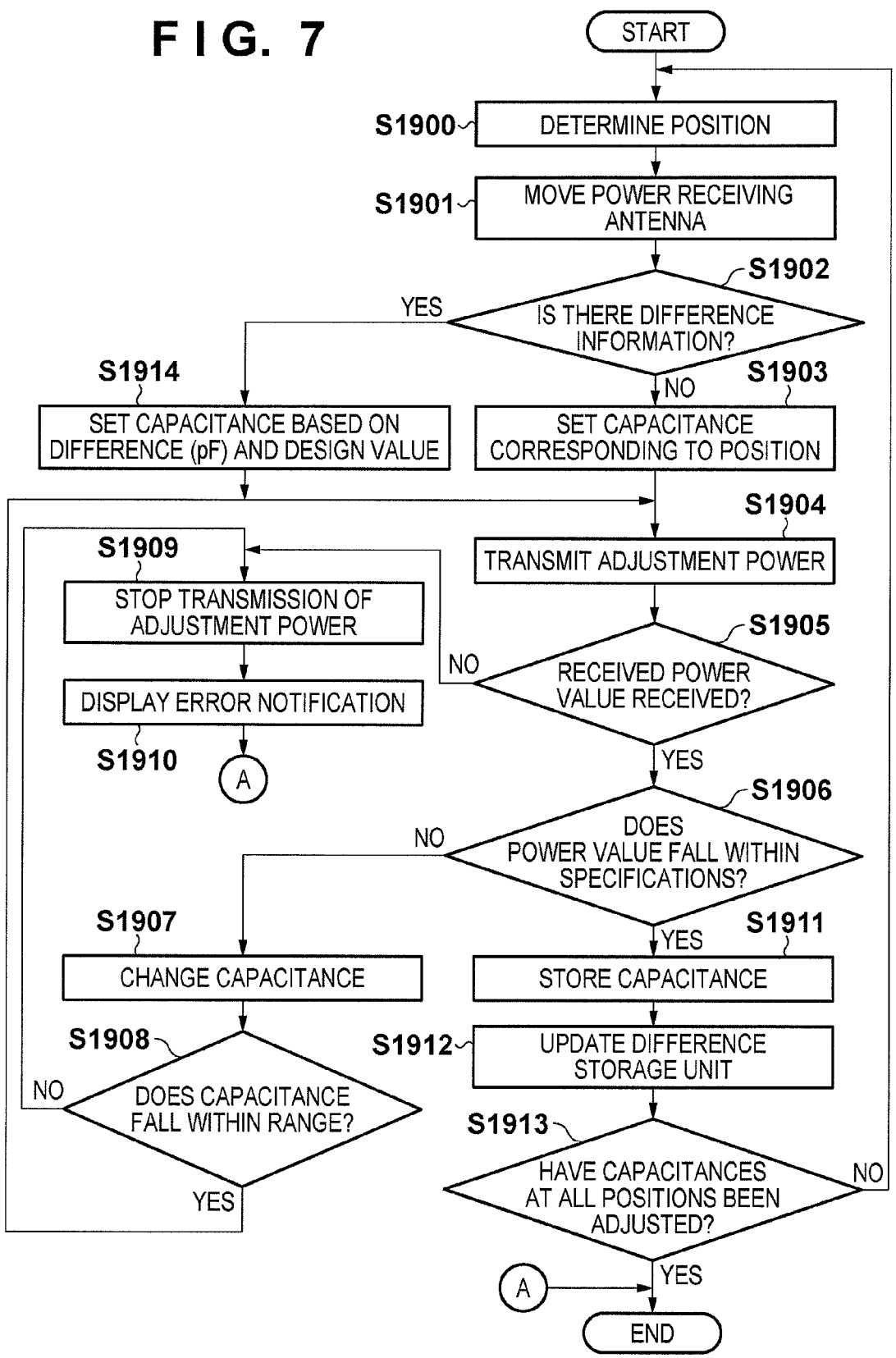
FIG. 7 is a flowchart for explaining a processing procedure of an adjustment unit.

This embodiment has been described on the assumption that the design values shown in FIG. 5C are held in advance to adjust the storage unit 402 according to the flowchart shown in FIG. 7. The flowchart of FIG. 7 is also applicable to a case in which the storage unit 402 is created when the design values of FIG. 5C are not held.

FIG. 8 is the flowchart at this time, which is the same as that shown in FIG. 7 except that steps S2300 and S2301 are substituted for steps S1903 and S1914 of FIG. 7, respectively. In FIG. 7, since the design values of FIG. 5C are held, the design value corresponding to position "0" is set in step S1903. In FIG. 8, however, there are no design values, the capacitance storage unit 1604 is referred to in step S2300, and a minimum capacitance of 25 pF is set. If a received power value at position "1" falls within the specifications (YES in step S1906), the adjustment unit 1600 stores the capacitance (S1911), and updates the difference storage unit 1606 (S1912). Each of FIGS. 9A to 9C shows the difference storage unit 1606 at this time. Reference numeral 2400 denotes a capacitance of the variable C 301 corresponding to each position; and 2401a, 2401b, or 2401c, a capacitance difference with respect to position "0" where the capacitance is first stored.

The adjustment unit 1600 performs adjustment at position "0", and stores a capacitance of 30 pF corresponding to position "0" (S1911). Position "0" is a position where a capacitance is first stored. Since this position becomes reference, the difference 2401a is not stored. FIG. 9A shows the difference storage unit 1606 at this time.

The unit 1600 moves the power receiving antenna to position "1" to perform adjustment. In step S1902, the adjustment unit 1600 refers to the difference storage unit 1606 shown in FIG. 9A but there is no difference information (NO in step S1902). Similarly to position "0", the adjustment unit 1600 refers to the capacitance storage unit 1604 to set the capacitance of the variable C 301 to a minimum capacitance of 25 pF. FIG. 9B shows the difference storage unit 1606 when the adjustment at position "1" ends. The difference 2401b corresponding to position "1" indicates the difference between the capacitance of 31 pF at position "1" and the reference capacitance of 30 pF indicated by the capacitance 2400 at position "0", and the difference 2401b at position "1" is therefore +1 pF.

The unit 1600 moves the power receiving antenna to position "2" to perform adjustment. In step S1902, the adjustment unit 1600 refers to the difference storage unit 1606 (FIG. 9B), and finds that there is difference information (YES in step S1902). Since the difference at the immediately preceding position "1" with respect to reference position "0" is +1 pF, the adjustment unit 1600 predicts a difference of +2 pF at position "2" with respect to the reference. The adjustment unit 1600 sets, as a capacitance at position "2", a capacitance of 32 pF obtained by adding +2 pF to the capacitance of 30 pF at position "0" (S2301), and transmits an adjustment power. As described above, if there is variable difference information, the adjustment unit 1600 sets, based on the difference information and a capacitance corresponding to another position, an initial value to be set in the variable C 301 in adjustment. With this operation, it becomes unnecessary to set a minimum capacitance value at each position every time like the processing in step S2300, thereby allowing to efficiently determine the capacitance 2400 corresponding to each position.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281010, filed Dec. 16, 2010, which is hereby incorporated by reference herein in its entirety.

What is claimed is:

1. A power transmitting apparatus, comprising:
a power transmitting unit configured to transmit power to a power receiving apparatus using an antenna; and
a control unit configured to change, in a case where the power receiving apparatus is moved from a first position to a second position when the transmitting unit transmits power to the power receiving apparatus using the antenna having a resonance frequency with a first value, the resonance frequency of the antenna from the first value to a second value according to the second position before the power receiving apparatus reaches the second position.

2. The apparatus according to claim 1, wherein the antenna is incorporated in the power transmitting apparatus.

3. The apparatus according to claim 1, further comprising an acquisition unit configured to acquire information of a power value received by the antenna.

4. The apparatus according to claim 3, further comprising an adjustment unit configured to adjust the antenna based on the power value information acquired by the acquisition unit.

5. The apparatus according to claim 1, wherein a position of the power receiving apparatus is a relative position of the power receiving antenna with respect to the antenna.

6. The apparatus according to claim 1, wherein the antenna includes a capacitor, and the control unit controls a static capacitance of the capacitor.

7. The apparatus according to claim 1, further comprising a unit configured to acquire information with regard to a position after movement of the power receiving apparatus, wherein the control unit performs controlling of the antenna based on the acquired information.

8. The apparatus according to claim 1, wherein the antenna is incorporated in the power receiving apparatus.

9. The apparatus according to claim 8, wherein the control unit changes the resonance frequency of the antenna from the first value to the second value, by instructing the power receiving apparatus to change the resonance frequency of the antenna.

10. A power transmitting apparatus which has a power transmitting antenna, and transfers power from the power transmitting antenna to a power receiving antenna, comprising:
a storage unit configured to be associated with a position of the power receiving antenna, and to store a parameter for controlling a resonance frequency of the power transmitting antenna;
a determination unit configured to determine the position of the power receiving antenna;
a control unit configured to control the resonance frequency of the power transmitting antenna based on the position of the power receiving antenna determined by the determination unit and the parameter stored in the storage unit; and
an acquisition unit configured to acquire first time information required for the power receiving antenna to move to a predetermined position,
wherein the storage unit stores, for each value of the parameter, second time information from when the parameter is changed until the resonance frequency of the power transmitting antenna becomes stable, and the control unit determines a timing of controlling the resonance frequency of the power transmitting antenna based on the first time information and the second time information.

11. A power transmitting apparatus which has a power transmitting antenna, and transfers power from the power transmitting antenna to a power receiving antenna, comprising:
- a storage unit configured to be associated with a position of the power receiving antenna, and to store a parameter for controlling a resonance frequency of the power transmitting antenna;
- a determination unit configured to determine the position of the power receiving antenna; and
- a control unit configured to control the resonance frequency of the power transmitting antenna based on the position of the power receiving antenna determined by the determination unit and the parameter stored in the storage unit;
- an acquisition unit configured to acquire information of a power value received by the power receiving antenna;
- an adjustment unit configured to adjust a parameter based on the power value information acquired by the acquisition unit; and
- a stop unit configured to stop, when the adjustment unit is unable to adjust the parameter within a predetermined range, power transfer from the power transmitting antenna to the power receiving antenna.

12. A power transfer system comprising:
a power transmitting apparatus comprising:
- a power transmitting unit configured to transmit power to a power receiving apparatus using an antenna, and
- a control unit configured to change, in a case where the power receiving apparatus is moved from a first position to a second position when the transmitting unit transmits power to the power receiving apparatus using the antenna having a resonance frequency with a first value, the resonance frequency of the antenna from the first value to a second value according to the second position before the power receiving apparatus reaches the second position; and
- a power receiving apparatus configured to receive a power transmitted from the power transmitting apparatus.

13. The system according to claim 12, wherein the power receiving apparatus further comprises a measurement unit configured to measure a power value received by the power receiving apparatus, and a notification unit configured to notify the power transmitting apparatus of the power value measured by the measurement unit.

14. A control method for a power transmitting apparatus including:
a power transmitting unit configured to transmit power to a power receiving apparatus using an antenna, the method comprising:
changing, in a case where the power receiving apparatus is moved from a first position to a second position when the transmitting unit transmits power to the power receiving apparatus using the antenna having a resonance frequency with a first value, the resonance frequency of the antenna from the first value to a second value according to the second position before the power receiving apparatus reaches the second position.

15. A storage medium storing a program for causing a computer to function as each unit of a power transmitting apparatus, the power transmitting apparatus comprising:
- a power transmitting unit configured to transmit power to a power receiving apparatus using an antenna; and
- a control unit configured to change, in a case where the power receiving apparatus is moved from a first position to a second position when the transmitting unit transmits power to the power receiving apparatus using the antenna having a resonance frequency with a first value, the resonance frequency of the antenna from the first value to a second value according to the second position before the power receiving apparatus reaches the second position.

16. A power transmitting apparatus, comprising:
- a power transmitting antenna;
- a power transmitting unit configured to transmit power to a power receiving antenna by using the power transmitting antenna; and
- a control unit configured to control, in a case where the power receiving antenna moves to a predetermined position, a resonance frequency of the power transmitting antenna based on the predetermined position with timing based on time required for the power receiving antenna to move to the predetermined position.

* * * * *